United States Patent [19]

Hiyamuta

[11] Patent Number: 4,584,824
[45] Date of Patent: Apr. 29, 1986

[54] SUGAR CANE HARVESTER

[75] Inventor: Shota Hiyamuta, Sakai, Japan

[73] Assignee: Kubota, Ltd., Japan

[21] Appl. No.: 494,020

[22] Filed: May 12, 1983

[30] Foreign Application Priority Data

Jul. 26, 1982 [JP] Japan .............................. 57-130103
Feb. 26, 1983 [JP] Japan .............................. 58-31226
Feb. 28, 1983 [JP] Japan .............................. 58-32511

[51] Int. Cl.⁴ .......................................... A01D 45/10
[52] U.S. Cl. ..................... 56/13.9; 56/14.5; 56/16.5
[58] Field of Search ............... 56/13.9, 14.3, 14.5, 56/16.5; 130/31 R

[56] References Cited

U.S. PATENT DOCUMENTS

| 3,925,969 | 12/1975 | Shunichi | 56/13.9 |
| 4,194,344 | 3/1980 | Mizzi | 56/13.9 |
| 4,196,569 | 4/1980 | Quick | 56/13.9 |
| 4,295,325 | 10/1981 | Cannavan | 56/13.9 |
| 4,332,128 | 6/1982 | Prince | 56/27.5 |

FOREIGN PATENT DOCUMENTS 479404 3/1975 Australia .............................. 56/13.9

Primary Examiner—Gene Mancene
Assistant Examiner—David I. Tarnoff
Attorney, Agent, or Firm—Cushman, Darby & Cushman

[57] ABSTRACT

In a sugar cane harvester having a defoliating device for scratching off the leaves of sugar canes, a plurality of separating means are disposed side by side with regular intervals such that leaves attached to sugar cane stalks are separated therefrom with the passage of sugar canes through the spaces between adjacent separating means.

11 Claims, 13 Drawing Figures

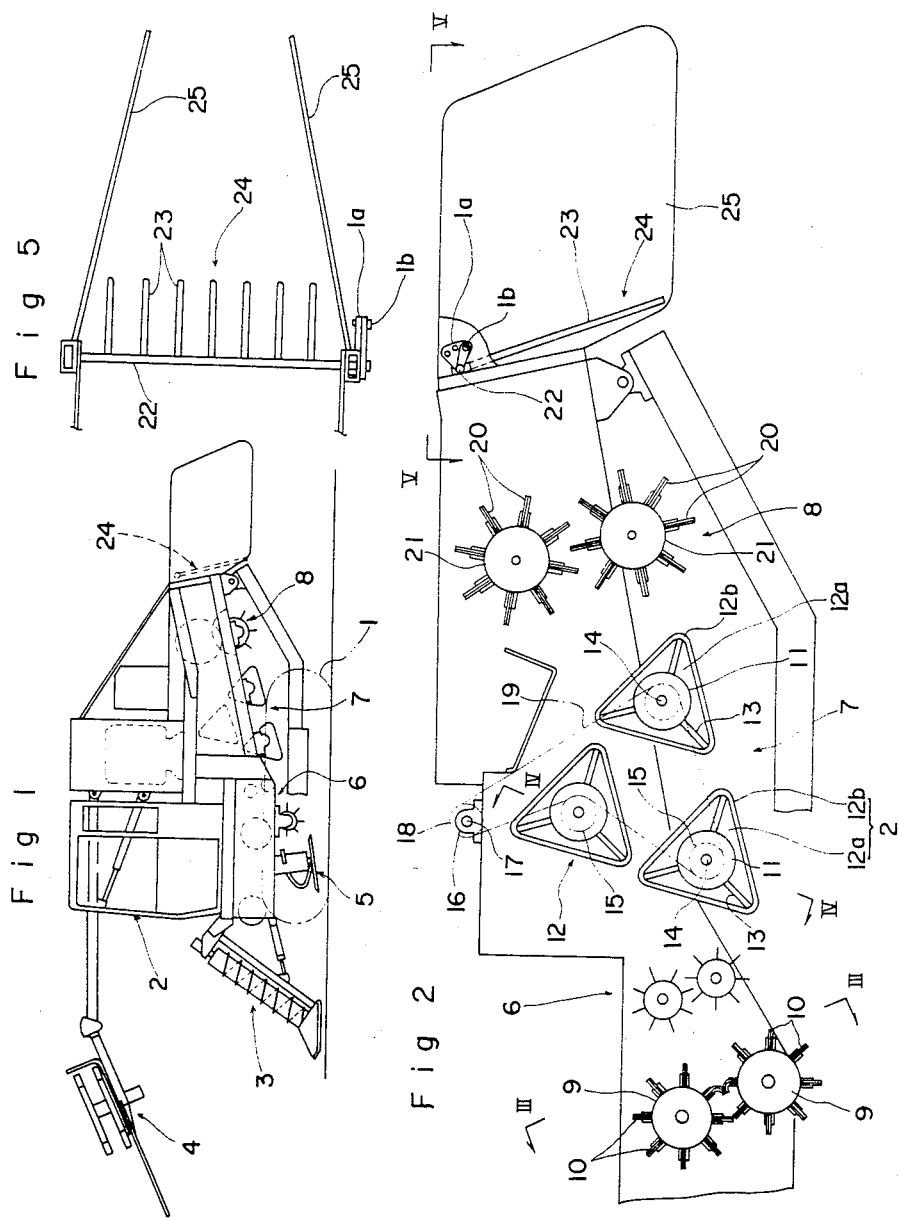

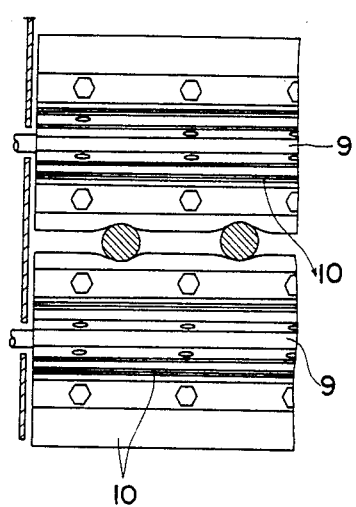
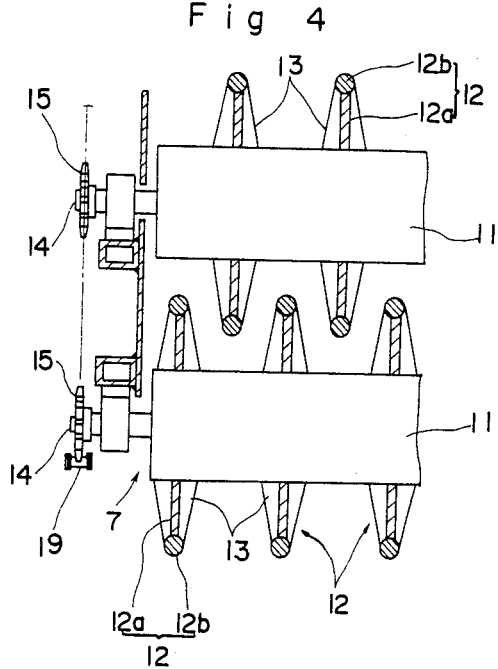
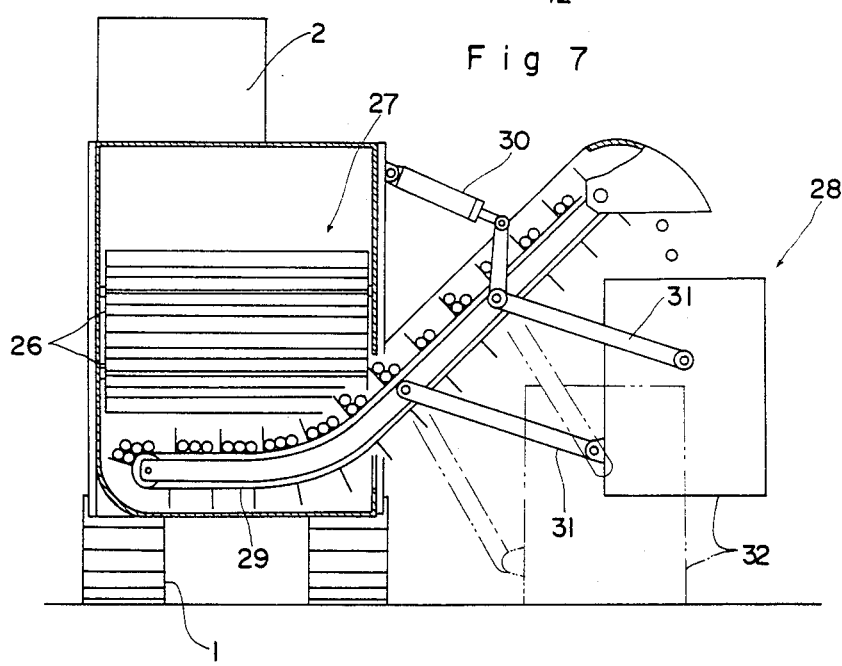

SUGAR CANE HARVESTER

BACKGROUND OF THE INVENTION (1) Field of the Invention

The present invention relates to a sugar cane harvester having a conveyor device for conveying harvested sugar canes in their stalk direction while holding the sugar canes as thrown down sideways, a defoliating device for scratching off the leaves of conveyed sugar canes, and a conveyor discharging devices for discharging defoliated sugar canes.

(2) Description of the Prior Art

In a conventional harvester of the type above-mentioned, sugar canes are discharged with the leaves remaining as attached to the stalkes, although the leaves have been scratched off from the stalks by the defoliating device. In either case where sugar cane stalks are collected as they are long or as they are cut into short pieces, a great quantity of leaves are mixed in collected stalks, thus requiring much labor in a post-treatment of leaf separation.

It has been therefore proposed to dispose a blower for blowing off attached leaves along the stalk transfer passage from the defoliating device to the discharging device and its rearward portion. However, separation of all leaves including those which wind round sugar cane stalks, requires a large-size blower, which disadvantageously increases not only the initial cost, but also the running cost since the entire harvester body is constructed in a large size requiring a great amount of power.

SUMMARY OF THE INVENTION

In view of the foregoing, it is an object of the present invention to provide an economical sugar cane harvester of the compact structure capable of satisfactorily separating attached leaves from sugar cane stalks.

In order to achieve the object above-mentioned, the sugar cane harvester in accordance with the present invention comprises a conveyor device for conveying harvested sugar canes in their stalk direction while holding the sugar canes which are not cut into pieces, as thrown down sideways, and a defoliating device for scratching off the leaves of conveyed sugar canes, and is characterized in that a plurality of separating means are disposed downstream with respect to the defoliating device in the sugar cane transfer direction and arranged side by side widthwise of the sugar cane transfer passage such that leaves attached to sugar canes are separated therefrom with the passage of the sugar canes through the spaces between adjacent separating means.

According to the present invention, sugar canes after subjected to defoliation are passed through the spaces between adjacent separating means, during which leaves attached to the sugar canes are caught by the separating means. Such leaves are forcibly removed from the sugar cane stalks, and thus separated leaves are then discharged to the outside of the harvester body along the separating means.

With such arrangement, the following operational effects can be produced.

Such leaf separating means may be constructed in a simple and compact structure such as rake-shape member, thereby to reduce the initial cost and the size of the entire harvester machine.

Even if an auxiliary fan is disposed for accelerating the discharge of separated leaves to the outside of the harvester, such fan may be of the light and small type, as compared with a blower designed specially for leaf separation. Thus, the running cost may also be greatly reduced.

According to the present invention, while the whole harvester may be economically made in a compact structure, scratch of leaves by the separating means may provide satisfactory leaf separation, permitting the post-treatment required before collection, to be efficiently conducted.

The harvester in accordance with the present invention is advantageous in a particular case where workers gather discharged sugar canes on the field. Namely, the harvester of the present invention permits sugar canes to be discharged on leaves which have been separated and discharged on the field. This eliminates sticking of soil to collected sugar canes, enabling the collection to be efficiently performed.

Other objects and advantages of the present invention will be apparent from the following description.

BRIEF DESCRIPTION OF THE DRAWINGS

FIG. 1 is a general side view of sugar cane harvester in accordance with the present invention;

FIG. 2 is an enlarged section view of main portions;

FIG. 3 is a section view taken along the line III—III in FIG. 2;

FIG. 4 is a section view taken along the line IV—IV in FIG. 2;

FIG. 5 is a view taken from the line V—V in FIG. 2;

FIG. 7 is a view, with portions broken away, taken from the line VII—VII in FIG. 6;

DESCRIPTION OF THE PREFERRED EMBODIMENTS

Figure 8:
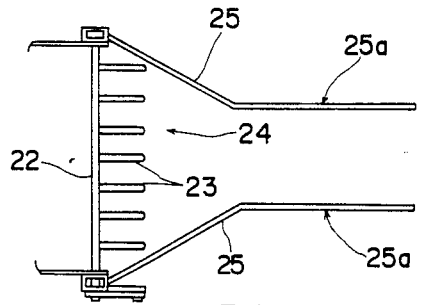
FIG. 8 is a plan view of another example of discharging guides.

FIG. 1 illustrates a sugar cane harvester having a pick-up means 3 at the front of a travelling body at which attached are a crawler travelling device 1 and a steering unit 2, a cutter 4 on and forward of the pick-up means 3 for cutting and removing the tip portions of sugar canes, a harvester device 5 rearwardly of the pick-up means 3 for harvesting the base portions of sugar canes, a conveyor device 6 on the crawler travelling device 1 for conveying harvested sugar canes while holding the same as thrown down sideways in the front and back direction of the harvester body, a defoliating device 7 also on the crawler travelling device 1 for stripping the leaves from sugar cane stalks in the middle course of their conveyance, and a conveyor discharging device 8 disposed rearward of the defoliating device 7.

Disposed rearward of the harvester device 5 are a pair of upper and lower scratching rotary members 9 for receiving harvested sugar canes with their base portions in the lead and transferring the same as thrown down sideways in the harvester in a front to back direction, to the conveyor device 6. These rotary members 9 are provided at the peripheries thereof with rubber blade members 10 spaced from each other at regular intervals. These blade members 10 are adapted to resiliently act on sugar canes to satisfactorily introduce the same without damage applied thereto even if the amount of introduced sugar canes varies.

The defoliating device 7 has one rotary member 11 disposed on the sugar cane transfer passage, and two rotary members 11 disposed under the sugar cane transfer passage. Each of the rotary members 11 has a blade member 12 including triangular-shaped plates 12a axially spaced from each other at regular intervals and pipes 12b disposed around the peripheries of the triangle-shape plates 12a. Stripping plates 13 are projectingly disposed on the both surfaces of each plate 12a substantially along the lines connecting the tops of the plate 12a to the axis of rotation of the blade member 12. Therefore, if leaves on the sugar cane stalks are difficult to be removed, such as, immature stalks harvested in the early part of the growing season, the projecting ends of the stripping plates 13 act on the base portions of the leaves to satisfactorily strip off the leaves.

Each of the rotary members 11 has at its rotary shaft 14 a sprocket 15. A chain 19 is wound on these sprockets 15 and a sprocket 18 attached to the output shaft 17 of a hydraulic motor 16 having a variable output. Such arrangement permits the rotation speed of the rotary members 11 or the driving speed of the defoliating device 7 to be steplessly varied independently from other devices. Thus, defoliation may be satisfactorily made regardless of the nature of sugar canes susceptible to break or other.

The discharging device 8 includes a pair of upper and lower discharging rotary members 21 each having at its circumference rubber pieces 20 at regular intervals. With such arrangement, defoliated sugar canes are transferred while being held by the rubber pieces 20 of the upper and lower rotary members 21, and these rubber pieces 20 act on the tips of harvested sugar canes, such that they are jumpingly discharged to the rearward of the harvester body.

There is set about 13° as an angle of intersection of a horizontal plane with respect to a plane at right angle to the imaginary line connecting the axes of rotation of the upper and lower discharging rotary members 21 to each other. Namely, about 13° is set as an angle of a horizontal plane with respect to a plane along which sugar canes are discharged by the discharging device 8. With such arrangement, sugar canes are not discharged, as if they pierce the field, at too remote positions rearward with respect to the harvester body, but may be thrown down on leaves which have been separated from sugar cane stalks and discharged on the field, as substantially held in a horizontal posture. It is to be noted that such angle of intersection is in the range from 10° to 15°.

Disposed rearward of the discharging device 8 is a rake-shape member 24 having rod-shape separating means 23 longitudinally attached to a support shaft 22 at regular intervals. With the support shaft 22 located above discharged sugar canes, this rake-shape member 24 is arranged such that discharged sugar canes pass through the spaces between adjacent separating means 23. With such passage of discharged sugar canes, leaves attached to stalks are adapted to be caught by the separating means 23 arranged widthwise of the sugar cane transfer passage, and then forcibly separated from the stalks.

The separating means 23 are inclined such that the lower portions thereof are located further rearward of the harvester body, thereby to smoothly cause the leaves separated from stalks along the separating means 23 to drop towards the ground's surface.

The support shaft 22 may be rotatably or fixedly secured to a bracket 1a connected to a harvester body frame by a pin 1b the connection position to the bracket 1a of which may be changed. It is therefore possible to adjust, according to the nature of leaves, the inclination angle of the separating means 23 the lower portions of which are located further rearward of the harvester body. Accordingly, when leaves are susceptible to intertwinement on the separating means 23, such inclination may be made gentle.

Disposed rearward of the separating means 23 are a pair of left- and right-hand discharging guides 25, the distance between which is tapered off toward the rearward of the harvester body. Such an arrangement enables sugar canes from which leaves have been separated, to be securely discharged to the field.

Figure 6:
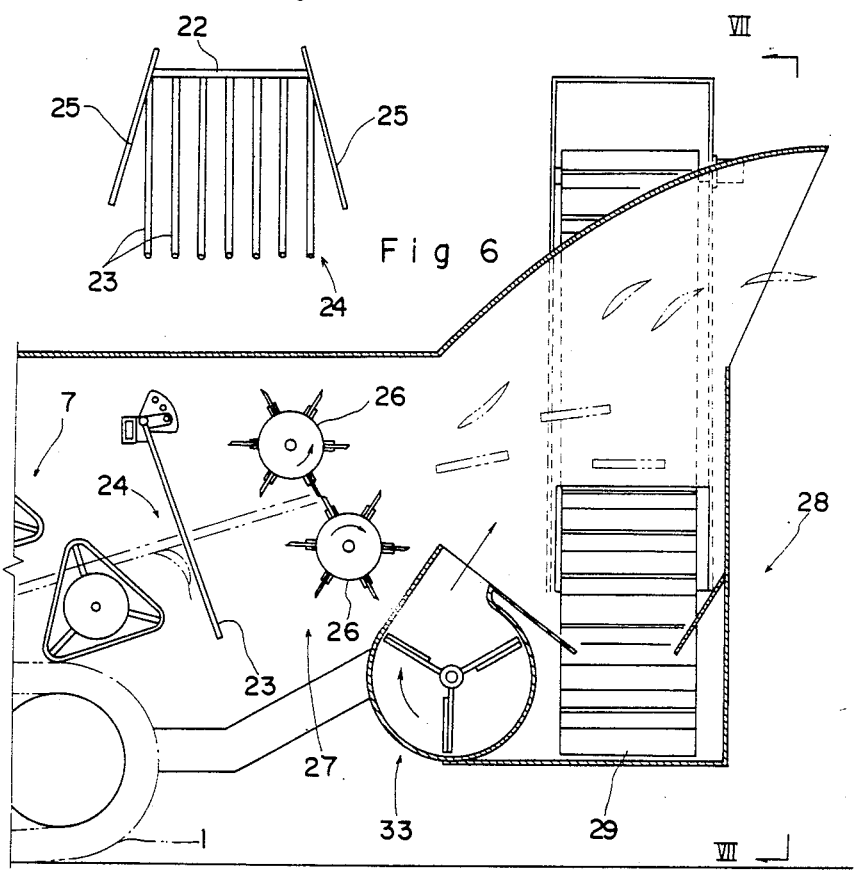
FIG. 6 is a section view of main portions illustrating how to harvest sugar canes cut into chips.

FIGS. 6 and 7 illustrate another example of the present invention in which the separating means 23 occupy the position of the discharging device 8 described above with reference to FIG. 2. Disposed rearward of the separating means 23 are a cutting device 27 having a pair of upper and lower rotary cutting means 26 for cutting discharged sugar canes in their stalk direction, and a collector device 28 for collecting sugar cane chips. With such arrangement, sugar canes from which leaves have been separated, are cut into chips which may be collected with lesser degree of leaf mixture.

The collector device 28 has a conveyor 29 for receiving and conveying stalk chips upward at one side of the harvester body, and a collector container 32 located adjacent the upper end of the conveyor 29 and supported by vertically swingable support arms 31 to be driven by a hydraulic cylinder 30. The collector container 32 may be thus drivingly moved to an upper or chip receiving position and a lower position close to the field, thus facilitating chip collection.

Disposed between the cutting device 27 and the conveyor 29 is a fan 33 for sending air upward and rearward of the harvester body. With the use of air current, this fan 33 may satisfactorily separate leaves from stalk chips, thereby to prevent mixture of leaves into collected chips.

Discharging guides 25 may be arranged as shown in FIG. 8, in which the discharging guides are turned at their rear portions 25a which are parallel to each other.

Figure 9:
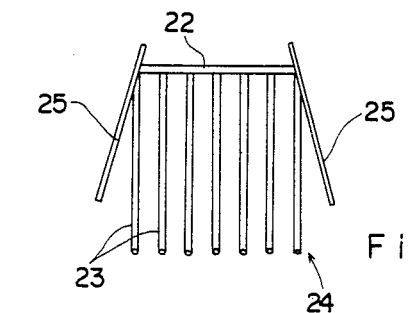
FIG. 9 is a back view of a further example of discharging guides.

The discharging guides 25 may also be arranged as shown in FIG. 9 in which the distance between the guides 25 viewed from the back, is made wider at the lower portions thereof. Such arrangement may impart resistance to sugar canes which tend to be upwardly discharged, thereby to prevent the sugar canes from being discharged at unnecessarily remote positions rearward of the harvester.

Figure 10A:
FIGS. 10a and 10b are section views of main portions respectively illustrating another examples of separating means.
Figure 10B:
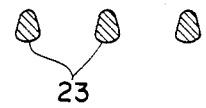

The shape of the separating means is not limited to a round rod, but may be variously modified. For example, their section shape may be semi-circular as shown in FIG. 10a or tapered in the direction toward the forward portion of the harvester body as shown in FIG. 10b.

According to the present invention, an auxiliary fan for downwardly sending air may be disposed between the discharging device 8 and the separating means 23, so that leaf separation from sugar cane stalks and subsequent flow down of thus separated leaves are satisfactorily made.

According to the present invention, the discharging device 8 may simultaneously form the defoliating device 7, thus eliminating provision of a pair of upper and lower discharging rotary members 21.

The angle of the separating means 23 with respect to the perpendicular plane is preferably in the range from 20° to 30°. The separating means 23 may also be constructed such that the distances between adjacent separating means 23 through which sugar canes pass, are adjusted dependent on the sugar cane stalk thickness. In this connection, the separating means 23 may be arranged like the ribs of a folding fan and vertically changed in their securing position.

Figure 11:
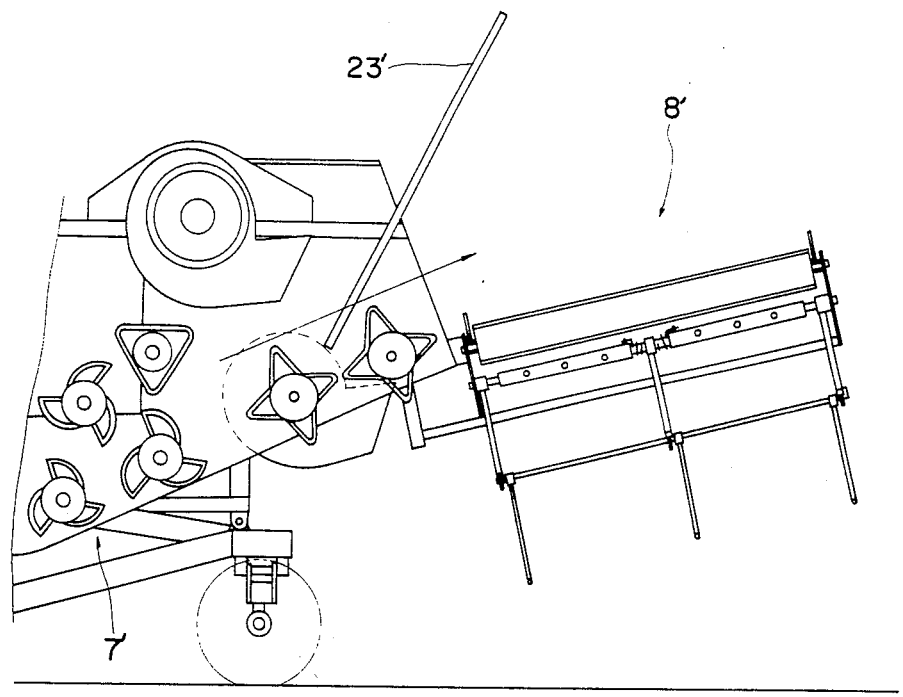
FIG. 11 is a side view of main portions of a further example of separating means.
Figure 12:
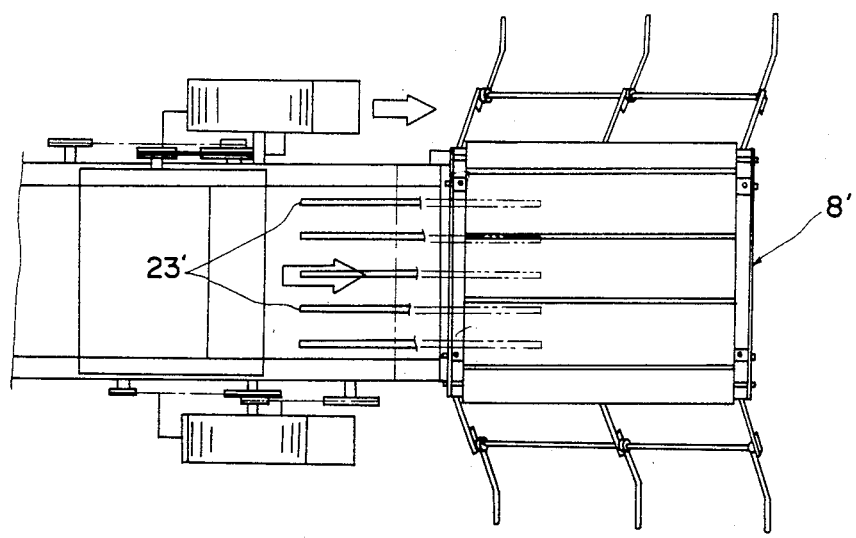
FIG. 12 is a plan view, with portions omitted, of FIG. 11.

FIGS. 11 and 12 illustrate another form of the separating means 23.

Rod-shape separating means 23' are put side by side in the course of the sugar cane transfer passage from the conveyor device 6, between a defoliating device 7' and a conveyor discharging device 8'. The separating means 23' cross the sugar cane transfer passage and are separated from each other with regular intervals in the transverse direction of the harvester body. Further, the separating means 23' are inclined in the direction from the lower front portion of the harvester body to the upper rearward portion thereof. With such arrangement, while sugar cane stalks pass through the spaces between adjacent separating means 23', leaves may be caught by the separating means 23', thereby to be separated from the stalks.

I claim:

1. In a sugar cane harvester having a harvester body, conveyor means mounted forwardly of said harvester body for conveying harvested sugar cane stalks along a defoliating path in a direction parallel to the direction of the stalks, and defoliating means for stripping leaves from the stalks conveyed along said defoliating path, said sugar cane harvester including a plurality of separating means disposed downstream with respect to said defoliating means in the sugar cane conveyance direction along said defoliating path and arranged side by side transversely relative to the defoliating path, said separating means for separating leaves attached to the sugar cane stalks therefrom in response to the passage of the sugar cane stalks through spaces defined between adjacent ones of said separating means, and wherein each said separating means includes a rod-shaped member inclined relative to said defoliating path such that a lower portion of said rod-shaped member is located further rearward of the harvester body, and wherein upper ends of said rod-shaped members are rigidly fixed to said harvester body and supported in a cantilever form.

2. A harvester as set forth in claim 1 further comprising cutting means disposed downstream with respect to the separating means along said defoliating path, said cutting for cutting said sugar can stalks, subsequent to their passage through said separating means, into pieces.

3. A harvester as set forth in claim 2, further comprising conveyor means for conveying sugar canes cut into pieces by the cutting means, and collector container means for collecting the cut sugar cane stacks conveyed by said conveyor means.

4. A harvester as set forth in claim 3, wherein the collector container means includes means to mount said container means for vertical pivotal movements between upper and lower positions.

5. A harvester as set forth in claim 2, further comprising conveyor discharging means disposed downstream with respect to the defoliating means along said defoliating path for conveying the sugar cane stalks to the separating means.

6. A harvester as in claim 4 wherein said means to mount includes linkage means permitting said container means to be pivotally displaced between said upper and lower positions and hydraulic cylinder means connected to said linkage means for displacing said container means between said upper and lower positions.

7. A sugar cane harvester comprising:
a harvester body including means to permit said body to travel across the surface of a field to be harvested;
harvesting means forwardly disposed on said harvester body to remove sugar cane stalks from the field as said harvester travels thereacross;
feed means for conveying said removed sugar cane stalks along a defoliating path; and
primary leaf-stripping means disposed along said defoliating path downstream of said harvesting means for stripping leaves from said sugar cane stalks conveyed along said defoliating path, said primary leaf stripping means including at least one pair of stripping rollers mounted for rotational movement about a rotation axis transversely oriented relative to said defoliating path, said pair of stripping rollers spaced-apart relative to one another so as to define therebetween a localized portion of said defoliating path and wherein each stripping roller includes:
(a) means defining plural substantially planar triangular-shaped blade members axially spaced apart relative to one another along said rotation axis of said stripping roller to define a stripping area between adjacent ones of said blade members, and
(b) plural stripping plates associated with respective ones of said blade member, each stripping plate radially mounted to said stripping roller and rigidly fixed to a lateral side surface of said respective blade member so as to project into said stripping area, wherein leaves of said sugar cane stalks conveyed into said stripping area along said defoliating path are contacted by said stripping plates rotated along with said stripping rollers whereby substantially all said leaves are stripped from said sugar cane stalks.

8. A harvester as in claim 7 further comprising secondary leaf-stripping means disposed downstream of said primary leaf-stripping means along said defoliating path, said secondary leaf-stripping means including plural rigidly fixed rod members arranged in side-by-side fashion in a plane transversely intersecting said defoliating path, adjacent ones of said rod members being separated from one another to establish a space through which said sugar cane stalks are conveyed, wherein remaining leaves on said stalks are contacted by said rod members as said stalks are conveyed through said space along said defoliating path thereby stripping said remaining leaves from said stalks.

9. A harvester as in claim 7 wherein said feeding means includes a pair of feed rollers each having resilient gripping blade means radially projecting from said feed roller for resiliently gripping said sugar cane stalks to assist in conveyance of said stalks along said defoliating path.

10. A harvester as in claim 8 wherein said rod-like members of said secondary leaf-separating means are angularly disposed relative to said defoliating path.

11. A harvester as in claim 10 wherein said secondary leaf-stripping means includes adjustment means to mount said rod-shaped members for permitting angular adjustment of said rod-shaped members relative to said defoliating path.

* * * * *